United States Patent
Kravets et al.

Patent Number: 5,570,681
Date of Patent: Nov. 5, 1996

[54] RESIDENTIAL BOILER/FURNACE WITH THE INTERMEDIATE WATER CIRCUIT

[76] Inventors: Aleksandr Kravets, 613 B Cranbury Cr. Rd., No. Brunswick, N.J. 08902; Eugene Tseytlin, 4314 Valley Dr., Allentown, Pa. 18104

[21] Appl. No.: 398,076

[22] Filed: Mar. 3, 1995

[51] Int. Cl.[6] ........................................... F24H 1/20
[52] U.S. Cl. ..................... 126/366; 126/360 R; 122/312
[58] Field of Search ..................... 126/360 A, 360 R, 126/366, 367; 417/159; 122/31.2

[56] References Cited

U.S. PATENT DOCUMENTS

| | | | |
|---|---|---|---|
| 2,025,695 | 12/1935 | Stewart | 126/360 A X |
| 2,594,063 | 4/1952 | Norman | 126/360 A X |
| 2,878,644 | 3/1959 | Fenn | 126/360 A X |
| 3,060,921 | 10/1962 | Luring et al. | 126/360 A X |
| 4,201,191 | 5/1980 | Zink et al. | 126/360 A |
| 4,685,444 | 8/1987 | Durrenberger | 126/360 A |
| 4,768,495 | 9/1988 | Zifferer | 126/360 A X |
| 5,271,378 | 12/1993 | Herold | 126/360 A |

*Primary Examiner*—William E. Tapoical
*Attorney, Agent, or Firm*—Ilya Zborvsky

[57] ABSTRACT

For transmitting a fuel heat energy to water or air the heating system performs the steps of producing fuel combustion products in a combustion chamber, sucking the fuel combustion products from the combustion chamber into an ejector and mixing the combustion products in the ejector with an intermediate water to provide an absorption of a combustion heat of the combustion products so as to heat the intermediate water, and supplying the heated water into a means in which the heated water transfers a heat accumulated in the heated water to a cold water from the heating system.

16 Claims, 2 Drawing Sheets

5,570,681

RESIDENTIAL BOILER/FURNACE WITH THE INTERMEDIATE WATER CIRCUIT

BACKGROUND OF THE INVENTION

The present invention relates to water heaters, hot water boilers and air furnaces for residential and commercial use, hereafter referred as residential heaters, which utilize a heat of fuel combustion as a heat source.

The present invention also relates to a method of transmitting a fuel heat energy to a medium.

Residential heaters have found broad implementation both in North America and around the world. That is why they became one of the important issues to cope with greenhouse effect and environmental pollution. For instance, in the United States the adverse impact of the space heating systems is of the same order as the yearly impact generated by highway traffic in conjunction with the most hazardous pollutant formation, such as nitrogen oxides. On the other hand their contribution to the greenhouse effect occurs due to relatively low annual fuel utilization efficiency. The later Department of Energy standard as of 1992 require the annual fuel utilization efficiency to be not less than 80% for hot water and steam residential boilers, and 78% for air heaters and furnaces with output rated up to 300,000 Btu/Hr. Nowadays the best residential boilers available on the market have the annual fuel utilization efficiency up to 84.5% for non-condensing and 91% for condensing designs.

The residential heaters utilize the heat of fuel combustion products to heat up an actuating medium such as water or air in order to bring the necessary amount of heat into a residential heating system. The heat from the combustion product is transferred to an actuating medium through the solid heat exchange surface by means of a free or forced convection. The free heat transfer mode is less efficient especially for gaseous media, i.e. it has an intrinsically low rate of heat transfer coefficient per unit of hour, heat exchange surface, and per a degree of temperature difference. This restricts the efficiency of the residential fuel heaters and, in turn, requires relatively a big and expensive heat exchanger surface to satisfy the necessary heat output. The forced convection which commonly is achieved by means of induced draft, does not make a difference for such restriction and yet leads to more expensive and complicated design.

Another narrow spot of the existing residential heater designs is an unstable and incomplete combustion and a safe operation for those heaters which have the output rated less than 60,000 Btu/Hr. In turn, it mandates the implementation of induced draft which unavoidably involves the above mentioned disadvantages. Besides, with the present design concept the heat transfer occurs at a relatively high average temperature and it causes the thermal nitrogen oxide formation which rising exponentially with the temperature.

Among other related disadvantages of the existing residential heaters involve insufficient safety of their operation. An additional precaution should be exercised to prevent a water hammering in case of water used as the actuating medium. Since water has the boiling temperature much lower than combustion products, a high chance of its sublimation exists. In connection with this, the control is provided with a pressure relief valve to reduce sudden pressure fluctuations of the actuating medium. This again contributes to complications of the control equipment and increase of the overall cost.

SUMMARY OF THE INVENTION

Accordingly, it is an object of the present invention to provide a device which avoids the disadvantages of the prior art.

More particularly, it is an object of the present invention to provide a device which allows more efficient utilization of fuel high heat value along with a concurrent enhancement of the heat transfer from the combustion products to the actuating medium, either water or air, and provides considerable decrease of the required heat exchange surface, with implementation in the combustion process of a forced draft and suppression of nitrogen oxides formation.

In keeping with these objects and with others which will become apparent hereinafter, one feature of the present invention resides, briefly stated, in a residential boiler burner which has an intermediate water circuit including a water pump and an ejector. The driving end of the ejector is connected with a pump outlet while a suction line is connected to a combustion zone. Thus, the water circulating through the intermediate circuit creates a negative pressure at the combustion zone outlet which allows its reliable supply with the combustion air and flue gas discharge. After burning of the fuel, all combustion products are sucked into the ejector to undergo a direct mixing with the water in the intermediate circuit. Due to the mixing, the circulating water accumulates an overwhelming part of the fuel high heat value, i.e., also including the heat of water vapors generated by combustion process. The flue gas temperature leaving the water circuit shall never exceed the water boiling temperature which is considerably lower than the temperature of the gas leaving the conventional residential boiler. From the thermodynamic standpoint, a corresponding heat efficiency increase has been proven.

In accordance with the present invention, also a method of transmitting a fuel heat energy to water or air is provided with the corresponding new features.

The intermediate water serves as a transmitting medium, to deliver a necessary heat to the actuating medium, either water or air, through the heat exchanger. The suction line of the intermediate circulating pump is connected with the heat exchanger to allow more efficient heat utilization of the circulating water by means of the forced convection heat transfer mode, and therefore leads to at least two times exchange surface reduction. The heat exchanger is also provided with an exhaust pipe. Due to the presence of the ejector, an excessive pressure on the discharge end of the intermediate circuit is built within the heat exchanger casing to force flue gases to leave through the exhaust pipe. The exhaust pipe along with the part of the return line of the actuating medium (or down comer) makes up an annulus which serves as a heat exchanger surface, to condense some water vapor from the exhaust products, since an equilibrium moisture is always present above the water surface at any temperature. This is also an additional means to increase useful output by recovering the useful heat from the flue gases.

The amount of the intermediate circulating water supply is consistent with the current heat output, while maintaining a temperature slightly lower than the boiling temperature to allow a complete condensation of the water vapor in the combustion products as well as to minimize their solubility. It is known that the gas solubility in water decreases as the temperature rises, and approaches zero at the boiling temperature. As said amount strictly depends on the necessary output, one motor may be used to drive both the intermediate circulating water and the actuating medium. To avoid complications in conjunction with the use of additional valves to control the additional circuit, a variable speed motor may be optionally used to drive the two media without any control valves.

The ejector allows to control air supply, which makes possible to implement any advance combustion technique such as air stagening without involving any other expensive equipment, and in turn to gain considerable emission reduction as the above mentioned nitrogen oxides. Besides, since the flame is quenched in the ejector, this leads to dramatic reduction of the average process temperature when compared with conventional residential heaters. As estimated overall effect of the thermal and prompt nitrogen oxides suppression is at least 60%. In particular, this is true for thermal, prompt and fuel nitrogen oxides.

Since the intermediate circuit is connected directly to atmosphere in the actuating medium, in particular water, has always higher temperature by operational requirements, there is no way the water can reach boiling temperature at any heater load, and in turn no hammering effect will ever take place. This fact both simplifies the control system and enhances the heater reliability with respect to safety operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
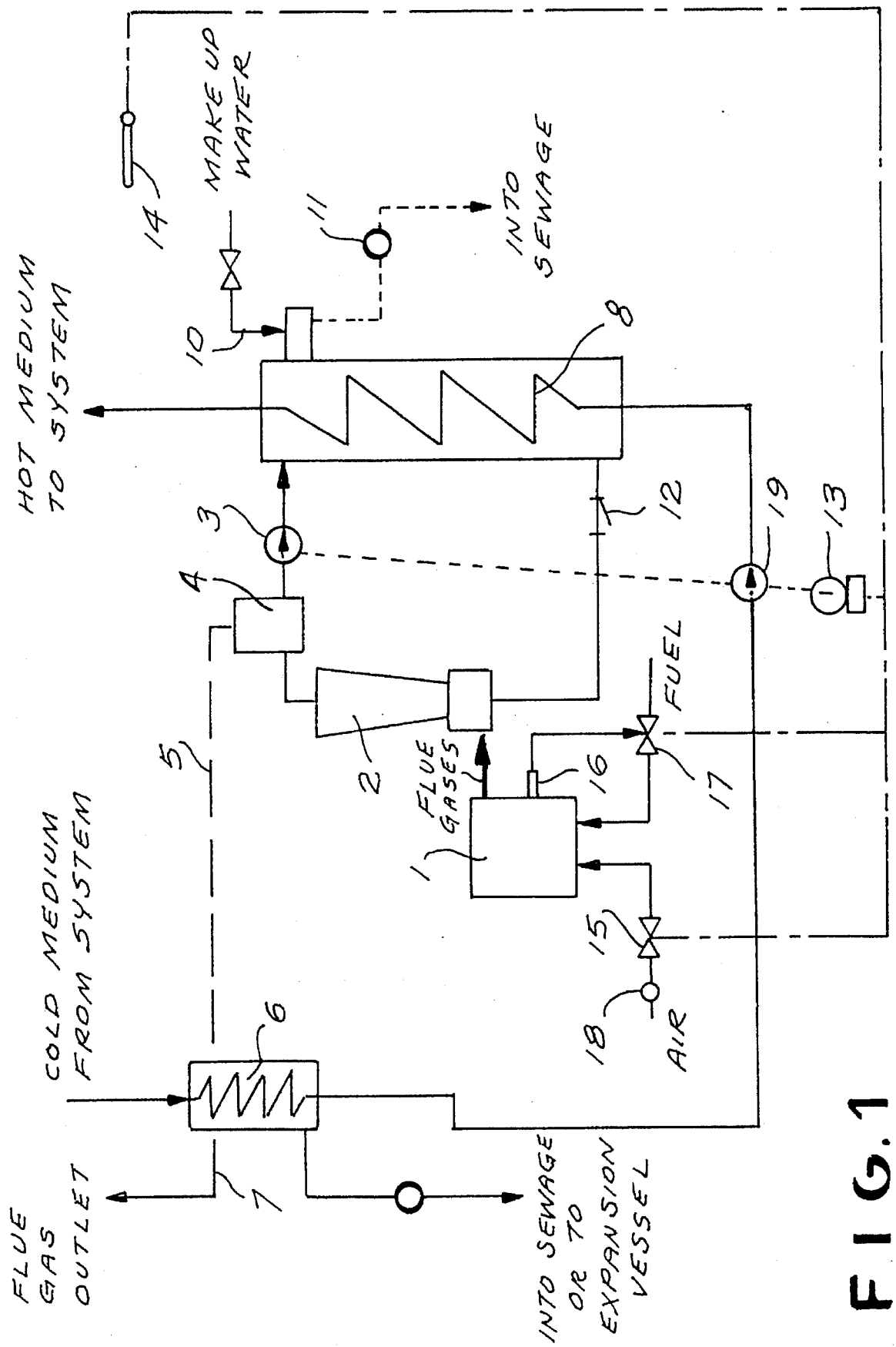
FIG. 1 is a view schematically showing a method of transmitting fuel heat energy to a heating system, such as water or air actuating medium, through a closed intermediate water circuit in accordance with the present invention.

A heating system in accordance with one embodiment of the present invention is shown in FIG. 1. Here fuel heat energy is transmitted to water or air heating system through an intermediate water circuit.

Fuel from a standard fuel train is supplied to a combustion chamber 1. The major part of atmospheric air required for complete combustion is sucked into the chamber 1 due to an induced draft created by a pressurized water passing through an ejector 2. The water pressure is provided by a pump 3. In a diffuser of the ejector, the water undergoes a direct mixing with flue gases sucked from the chamber 1 and accumulates an overwhelming part of heat energy of the flue gases, including heat of moisture due to combustion which they contain. The hot water maintained close to the boiling temperature then expands in an expansion vessel 4 where the flue gases are evacuated through a vent line 5 connected to a condenser 6. A further cooling of the flue gases takes place in the condenser 6 due to heat exchange with the cold actuating medium (water/air) which is returning from the heating system. This eliminates an equilibrium moisture from the flue gases by condensing and increases heat utilization efficiency. The flue gases finally discharge through a stack 7 due to an excessive pressure sustained by the ejector 2. The condensate from the condenser 6 can be either disposed into sewage line or returned to the expansion vessel.

The water from the expansion vessel 4 is supplied under pressure to a heat exchanger 8 where its heat is transferred to the actuating medium preheated in the condenser 6, and is driven by an actuator 9, formed either as a water pump or an air fan. Since the both media are force-driven, a high efficiency forced convection heat transfer mode takes place, and thereby a corresponding reduction of heat exchange surfaces is provided.

The water pump 3, the ejector 2 along with the expansion vessel 4, and a strainer 12 (optional), and one of the passes of the heat exchanger 8 together form an intermediate water circuit. A make up water inlet 10 and a drain water discharge 11 are provided to accommodate any level fluctuations in the intermediate water circuit due to water vapor from condensation of the flue gases or due to a partial water disposal.

It is clear that the output of the heating system determines the intermediate circuit output and they are also directly proportional. As a result, the pump 3 and the actuator 9 may be driven by one motor 13, so that the design of the heating system is simplified. On the other hand, it is possible to use separate motor-driven actuators.

A thermostat 14 controls an interior temperature. When the thermostat 14 calls for a rise in the interior temperature, the pump 13 is actuated and an air damper 15 opens completely to allow blowing down of any residue in the combustion chamber 1. When the pressure (draft) in the combustion chamber reaches a desired level, a pressure switch 16 opens a fuel shut-off valve. Thus, the heater transfers an invaluable heat output to the actuating medium until the required interior temperature is reached. When the required interior temperature has been reached, the thermostat also stops the heater in a reverse order. A variable restriction orifice 18 serves for adjusting an appropriate fuel combustion during the start up, to accommodate any deviations of specific conditions from the design conditions.

Figure 2:
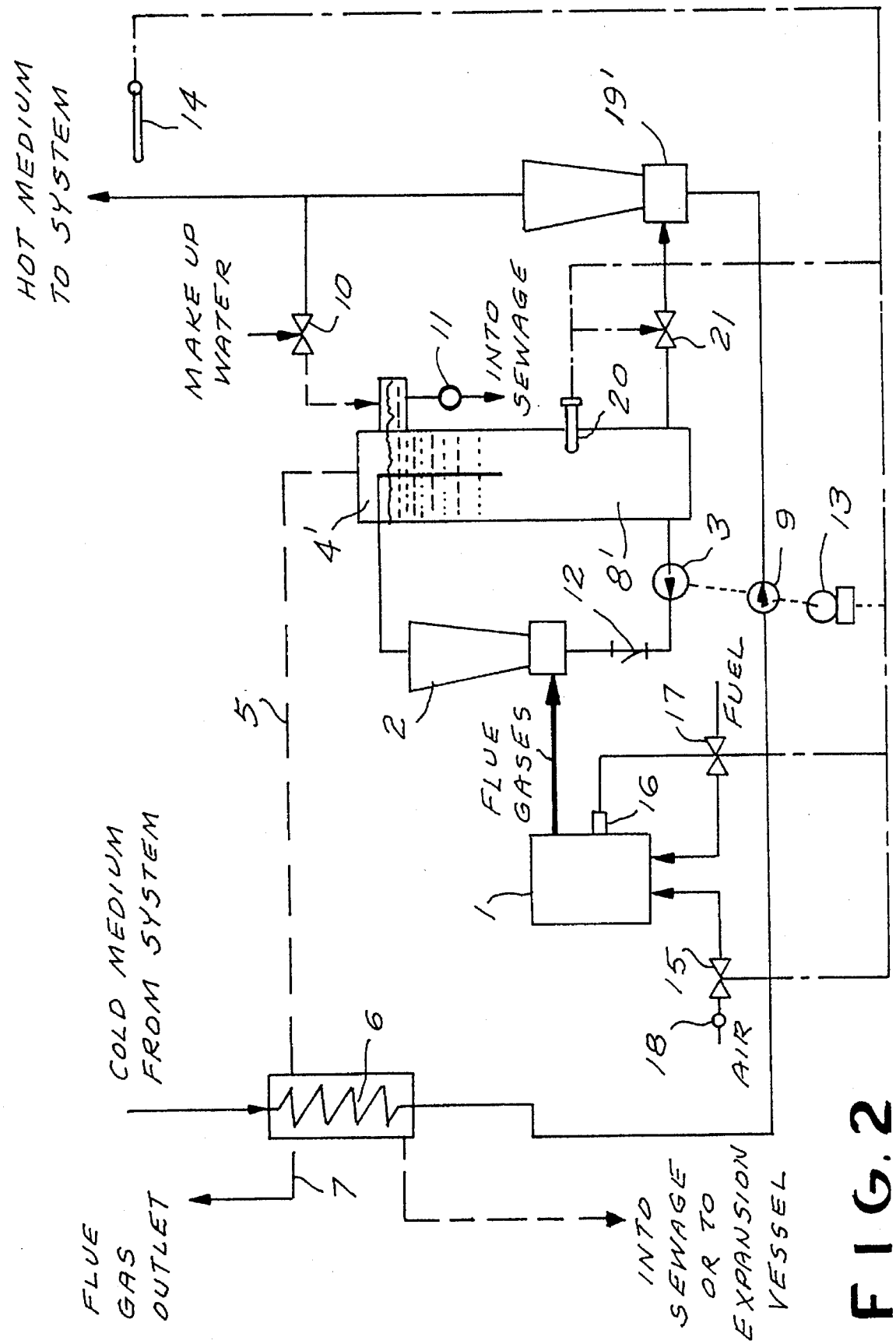
FIG. 2 is a view schematically showing a method of transmitting fuel heat energy to a heating system, such as a water actuating medium only, through an open intermediate water circuit.

A heating system in accordance with a second embodiment is shown in FIG. 2. It is provided for transmitting fuel heat energy only to a water heating system. In this embodiment there is no heat transfer surface which leads to a significant reduction of both manufacturing and operation expenses. Also, here there is no restriction related to the heat transfer, which in turn results in higher heat performance efficiency. Also, the hazardous emissions are reduced in this construction.

The construction of the system shown in FIG. 2 substantially corresponds to the construction of the system shown in FIG. 1, and similar parts are identified with same reference numerals.

The heated water from the intermediate circuit is stored in a tank 8' and then mixed with the actuating water in another ejector 19'. To prevent the flue gases carry over into the actuating medium the hot intermediate water temperature is maintained at the boiling point in the expansion vessel 4, which can be combined in this case with the tank 8', to sustain a complete degassing of the water. In turn, it helps to avoid any voids within the heat transfer surfaces (baseboards) filled with flue gases in the heating system.

In order to apply the inventive heating system to a residential heater, the control system can include a temperature switch 20 connected to a shut off valve 21. The valve opens when the boiling temperature is reached, while the thermostat 14 calls for the interior temperature increase. If this request is not satisfied, but the temperature in the intermediate circuit has dropped lower than a preset temperature (slightly less than the boiling point), the shut off valve 21 closes to allow the water temperature in the intermediate circuit to reach the preset temperature.

It will be understood that each of the elements described above, or two or more together, may also find a useful application in other types of constructions and methods differing from the types described above.

While the invention has been illustrated and described as embodied in a residential boiler/furnace with the intermediate water circuit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of transmitting a fuel heat energy to a medium selected from the group consisting of water and air, the method comprising the steps of producing fuel combustion products in a combustion chamber; sucking the fuel combustion products from the combustion chamber into an ejector and mixing the combustion products in the ejector with an intermediate water to provide an absorption of a combustion heat of the combustion products so as to heat the intermediate water; and supplying the heated water into a means formed as a heat exchange in which the heated water transfers a heat accumulated in the heated water to a cold water from a heating system.

2. A method as defined in claim 1, wherein said supplying includes supplying the heated water into the means formed as a heat exchanger in which the heated water transfers the accumulated heat to the cold water which is returned from the heating system.

3. A method as defined in claim 1, wherein said supplying includes storing the heated water in a hot water tank, and supplying the heated water from the hot water tank for direct mixing with the cooled water which is returned from the heating system.

4. A method as defined in claim 1; and further comprising the step of driving the ejector by a pressurized water pump.

5. A residential heating system, comprising a combustion chamber for burning fuel and forming fuel combustion products; an ejector connected with said combustion chamber in which the combustion products from said combustion chamber are supplied and mix with an intermediate water to provide an absorption of a combustion heat of the combustion products by the intermediate water so as to heat the intermediate water; and means for receiving the heated water and transferring a heat accumulated in the heated water to a cold water from the heating system.

6. A residential heating system as defined in claim 5, wherein said means includes a heat exchanger to which the heated water is supplied and in which the heated water transfers the accumulated heat to the cooled water returning from the heating system.

7. A residential heating system as defined in claim 5, wherein said means includes a hot water tank into which the heated water is supplied and from which it is further supplied for direct mixing with the cooled water returned from the heating system.

8. A residential heating system as defined in claim 5; and further comprising a condenser through which the combustion products are passed in heat exchange with a cold actuating medium to eliminate an equilibrium moisture; and means for supplying the actuating medium into said condenser to cool down the combustion products in it.

9. A residential heating system as defined in claim 5; and further comprising an expansion vessel, said ejector having an outlet at which the intermediate water mixed with the combustion products is maintained at a temperature which is close to boiling temperature to allow complete degassing in said expansion vessel.

10. A residential heating system as defined in claim 9, wherein said expansion vessel is a separate element.

11. A residential heating system as defined in claim 9, wherein said expansion vessel is a part of said means formed as a heat exchanger.

12. A residential heating system as defined in claim 9, wherein said expansion vessel is a part of said means formed as a hot water tank.

13. A residential heating system as defined in claim 5; and further comprising a pressurized water pump which drives said ejector; an actuator for driving the medium; and a common motor for said pump and for said actuator.

14. A residential heating system as defined in claim 13, wherein said actuator is a pump for the water.

15. A residential heating system as defined in claim 13, wherein said actuator is a fan for the air.

16. A residential heating system as defined in claim 5, wherein said ejector is formed so as to provide a combustion air supply in said combustion chamber and a discharge of the combustion products from said combustion chamber.

* * * * *